(12) United States Patent
de Marcken

(10) Patent No.: US 8,583,460 B2
(45) Date of Patent: Nov. 12, 2013

(54) PRICING TICKETS BASED ON CONSTRUCTING TABLES OF PRICING UNITS FOR SUB-PORTIONS OF A TICKET

(75) Inventor: Carl G. de Marcken, Seattle, WA (US)

(73) Assignee: Google Inc., Mountain View, CA (US)

( * ) Notice: Subject to any disclaimer, the term of this patent is extended or adjusted under 35 U.S.C. 154(b) by 1650 days.

(21) Appl. No.: 11/184,743

(22) Filed: Jul. 19, 2005

(65) Prior Publication Data

US 2007/0021989 A1  Jan. 25, 2007

(51) Int. Cl.
*G06Q 10/00* (2012.01)

(52) U.S. Cl.
USPC .............................................. 705/5

(58) Field of Classification Search
USPC ...................................... 705/1.1, 5
See application file for complete search history.

(56) References Cited

U.S. PATENT DOCUMENTS

| | | |
|---|---|---|
| 4,862,357 A | 8/1989 | Ahlstrom et al. |
| 5,021,953 A | 6/1991 | Webber et al. |
| 5,177,684 A | 1/1993 | Harker et al. |
| 5,237,499 A | 8/1993 | Garback |
| 5,253,166 A | 10/1993 | Dettelbach et al. |
| 5,255,184 A | 10/1993 | Hornick et al. |
| 5,270,921 A | 12/1993 | Hornick |
| 5,422,809 A | 6/1995 | Griffin et al. |
| 5,570,283 A | 10/1996 | Shoolery et al. |
| 5,623,413 A | 4/1997 | Matheson et al. |
| 5,644,721 A | 7/1997 | Chung et al. |
| 5,652,867 A | 7/1997 | Barlow et al. |
| 5,794,172 A | 8/1998 | Matheson et al. |
| 5,797,127 A | 8/1998 | Walker et al. |
| 5,832,453 A | 11/1998 | O'Brien |
| 5,832,454 A | 11/1998 | Jafri et al. |
| 5,838,973 A | 11/1998 | Carpenter-Smith et al. |
| 5,839,114 A | 11/1998 | Lynch et al. |
| 5,897,620 A | 4/1999 | Walker et al. |
| 5,948,040 A | 9/1999 | DeLorme et al. |
| 6,119,094 A | 9/2000 | Lynch et al. |
| 6,275,808 B1 * | 8/2001 | DeMarcken ............... 705/6 |
| 6,400,289 B1 * | 6/2002 | Banerji ................... 341/60 |
| 6,418,413 B2 | 7/2002 | de Marcken et al. |
| 2002/0143587 A1 * | 10/2002 | Champernowne ........... 705/5 |
| 2003/0097355 A1 | 5/2003 | Kapitskaia et al. |
| 2006/0074631 A1 * | 4/2006 | Wang et al. .............. 704/9 |
| 2006/0245654 A1 * | 11/2006 | Viola et al. ............. 382/229 |
| 2007/0073563 A1 | 3/2007 | Dourthe et al. |
| 2008/0010059 A1 * | 1/2008 | Mohri .................... 704/9 |

FOREIGN PATENT DOCUMENTS

WO   WO 02/25557 A2   3/2002

OTHER PUBLICATIONS

U.S. Appl. No. 10/456,975, filed Jun. 6, 2003, de Marcken et al.
U.S. Appl. No. 10/456,997, filed Jun. 6, 2003, de Marcken et al.
U.S. Appl. No. 10/456,980, filed Jun. 6, 2003, de Marcken et al.
Authorized officer Athina Nickitas-Etienne, International Report on Patentability in PCT/US2006/027536, mailed Mar. 26, 2009, 6 pages.
Authorized officer John W. Hayes, International Search Report and Written Opinion in PCT/US2006/027536, mailed Jul. 30, 2008, 12 pages.

* cited by examiner

*Primary Examiner* — Shannon Campbell
(74) *Attorney, Agent, or Firm* — Fish & Richardson P.C.

(57) ABSTRACT

Pricing of a sequence of transportation units includes receiving a set of sellable-units, encoding the set of sellable-units into a context-free grammar that represents possible ways that the sellable-units can be combined to produce valid tickets and producing a ticket from the encoded set of sellable units.

42 Claims, 9 Drawing Sheets

PRICING TICKETS BASED ON CONSTRUCTING TABLES OF PRICING UNITS FOR SUB-PORTIONS OF A TICKET

BACKGROUND

This invention relates to travel pricing, and more particularly to pricing for air travel using travel planning computer systems.

Air travel tickets are commonly priced using one or more units of price called "fares." In the airline industry, the word "fare" is generally used to refer to a price published by an airline for one-way travel between two cities (a "market") that may be used to price one or more flights on a ticket. A single fare may be used to pay for more than one flight, subject to fare-specific rules. The term "fare-component" is commonly used to refer to a fare and the flights of a ticket paid for by that fare.

Airlines commonly require that the fare-components of a ticket be grouped into units called "priceable-units" (PUs). A priceable-unit may be thought of as the smallest sub-ticket that could be sold on its own. The purpose of priceable-units is to require certain fares to be sold in conjunction with other fares. For example, it is common for so-called "round-trip" or "tag-2" fares to have rules that require the fares to be grouped with other fares into priceable-units of 2 or 3 or 4 fares known as round-trip, circle-trip and open-jaw priceable-units. For example, a circle-trip priceable-unit is a priceable-unit of 3 or 4 fares arranged in a circle, such as NYC→LAX, LAX→MIA, MIA→NYC. A round-trip priceable-unit is a circle-trip of size 2, such as BOS→LAX, LAX→BOS. Open-jaw priceable-units are circle-trips with one missing fare, such as BOS→SFO, LAX→BOS. Some fares, so-called "one way" or "tag-1" fares, may be used in priceable units of a single fare, such as NYC→SFO however such fares are frequently more expensive than tag-2 fares.

Typically, airlines associate with tag-2 fares various fare rules that limit the fare combinations that may appear within one priceable-unit. For example, it is common for tag-2 fares' rules to require that all fares in the same priceable unit have the same or similar codes (names). Tag-2 fares' rules may also impose restrictions on flight or time combinations. For example, so-called "excursion" fares are tag-2 fares that have rules that impose minimum-stay restrictions such as Saturday-night stay restrictions. Frequently these rules are stated as follows: a certain amount of time must pass between the departure of the first flight in the first fare-component of the priceable-unit and the first flight of the last fare-component of the priceable-unit.

The necessity of grouping certain fares into priceable-units, and the possibility of rules that restrict fare and flight or time combinations within a priceable-unit, implies that there are dependencies between the pricing of different flights on a ticket.

SUMMARY

According to an aspect of the present invention, a method of pricing a sequence of transportation units includes receiving a set of sellable-units, encoding the set of sellable-units into a context-free grammar that represents possible ways that the sellable-units can be combined to produce valid tickets and producing a ticket from the encoded set of sellable units.

The following embodiments are within the scope of the claims.

Encoding the set of sellable units includes adding a context free grammar rule for each of the sellable units. The rule for the context-free grammar is of the form $P[i] \Longrightarrow FA[i][1] \ldots FA[i][n[i]]$. The faring-atoms are represented as sets of flights and adding rules to the context-free grammar includes expanding faring-atoms into their component flights in order that the context-free grammar represents tickets as sequences of flights, by adding a rule for each faring-atom $FA[k]$ of length $L[k]$ as: $FA[k] \Longrightarrow Flight[k][1] \ldots Flight[k][L[k]]$. The set of sellable units are priceable units. The context-free grammar supports non-consecutive fare-components by allowing an arbitrary number of sellable-units to appear between every fare-component of a priceable-unit. Extending the context-free grammar supports non-consecutive fare-components by allowing an arbitrary number of priceable-units to appear between every fare-component of a sellable-unit. The core grammar non-terminal nodes are extended with sets of partially completed priceable units to account for crossing priceable-units. The sellable-units contain multiple fare-components, and the grammar includes augmenting the grammar with a set that represents the set of crossing sellable-units whose first fare-component appears within the non-terminal's expansion and augmenting the grammar with a set that represents the set of crossing sellable-units whose second fare-component appears within the non-terminal's expansion. Parsing a lattice of terminals with the context free grammar produces a packed parse forest representation in a form of an AND/OR graph representation. Enumerating priced tickets that include assignments of fares to flights from the AND/OR graph representation. The method associates price information with the context-free grammar. Associating price information includes linking the price information with non-terminal priceable-unit symbols in the context free grammar. Linking links the price information with the context-free grammar to link the fares as a list. The priceable-units are represented as a set of priceable-unit-labels linked to priceable-unit-cores, where a priceable-unit-label is a factored representation of faring-atom combinations and a priceable-unit-core is a factored representation of fare combinations to encode the context-free grammar.

According to an additional aspect of the present invention, a method of pricing multiple tickets includes receiving a set of priceable-units, encoding the set of priceable-units into a context-free grammar that represents possible ways that the priceable-units can be combined to produce valid tickets, constructing a lattice of flights that represents permitted flight combinations for a ticket and parsing the lattice to produce a packed parse forest representation of valid priced tickets.

The following embodiments are within the scope of the claims. The packed parse forest representation is a standard representation of valid parses of the lattice. The method associates pricing information with the grammar to build the ticket. The ticket is built from one or more priceable-units. The price information is fares. The price information is associated with the grammar by linking the price information with non-terminal priceable-unit symbols in the grammar representations of the priceable-unit's fares.

According to an additional aspect of the present invention, a method for pricing a sequence of flights includes receiving a set of sellable units and successively building a table $T_{ij}$ of possible pricings of subsequences of flights from a flight i to a flight j. The following embodiments are within the scope of the claims. The sellable units are limited to a specific sequence of flights. The sellable units are priceable units. The table entry $T_{ij}$ is a representation of the mathematical union. The table $T_{ij}$ maintains at most a single pricing for each subsequence of flights. The lattice is a unique sequence of flights. The method further includes producing a packed forest representation of possible tickets.

According to an additional aspect of the present invention, a method for generating a ticket includes receiving a set of sellable units, receiving a set of flight constraints, encoding the sellable units into a grammar that represents the possible ways the sellable units can be combined to produce valid tickets and transforming the grammar to encode the flight constraints. The method also includes successively expanding a root node of the grammar to produce a sequence of grammar terminals.

According to an additional aspect of the present invention, a computer program product tangible embodied on a computer readable medium for pricing a sequence of transportation units includes instructions to receive a set of sellable-units; encode the set of sellable-units into a context-free grammar that represents possible ways that the sellable-units can be combined to produce valid tickets and produce a ticket from the encoded set of sellable units.

According to an additional aspect of the present invention, a computer program product tangible embodied on a computer readable medium for pricing a sequence of transportation units includes instructions to receive a set of priceable-units, encode the set of priceable-units into a context-free grammar that represents possible ways that the priceable-units can be combined to produce valid tickets, construct a lattice of flights that represents permitted flight combinations for a ticket and parse the lattice to produce a packed parse forest representation of valid priced tickets.

According to an additional aspect of the present invention, a computer program product tangible embodied on a computer readable medium for pricing a sequence of transportation units includes instructions to receive a set of sellable units, successively build a table $T_{ij}$ of possible pricings of subsequences of flights from a flight i to a flight j.

According to an additional aspect of the present invention, a computer program product tangible embodied on a computer readable medium for pricing a sequence of transportation units includes instructions to receive a set of sellable units, receive a set of flight constraints, encode the sellable units into a grammar that represents the possible ways the sellable units can be combined to produce valid tickets, transform the grammar to encode the flight constraints and successively expand a root node of the grammar to produce a sequence of grammar terminals.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
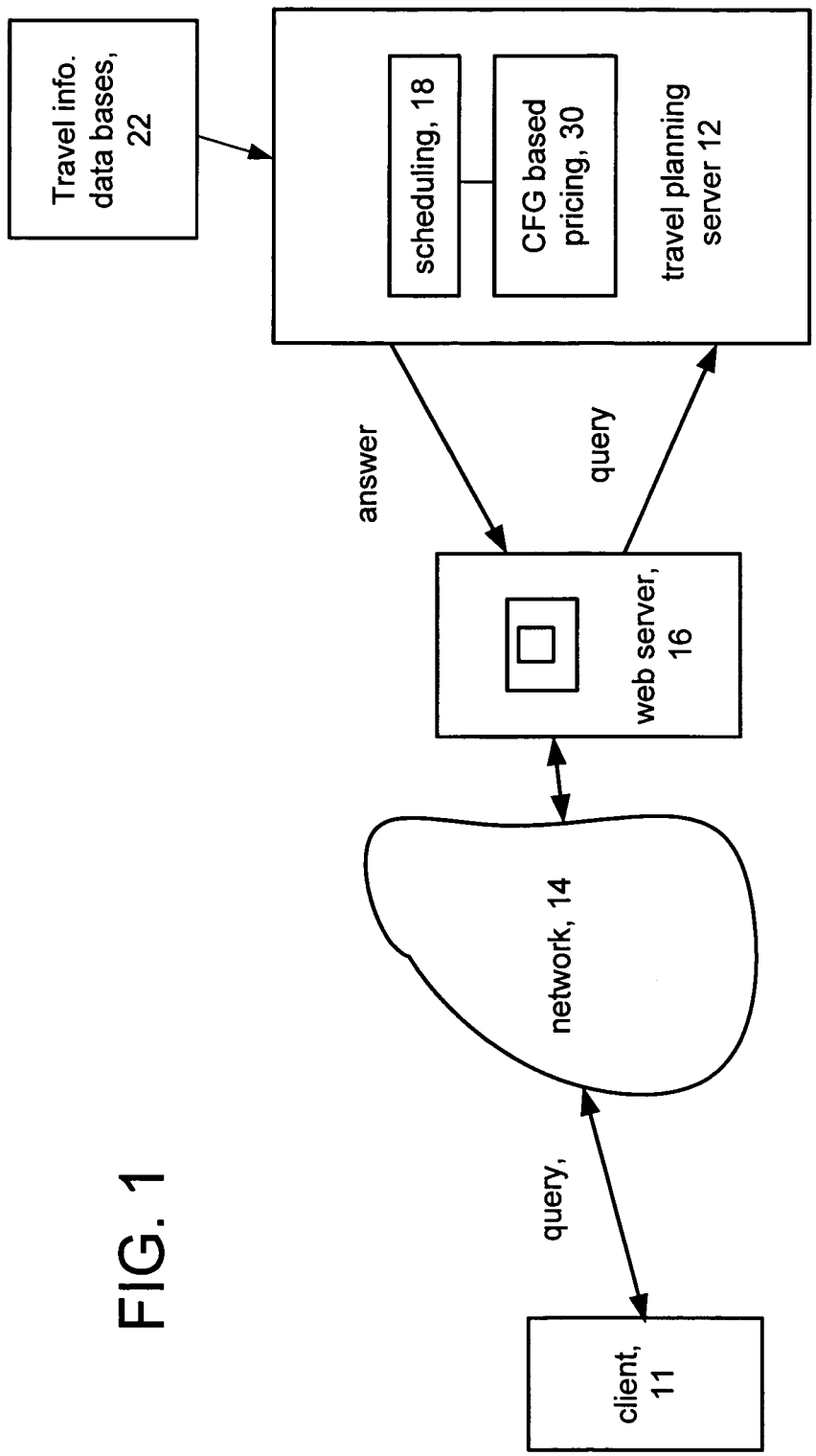
FIG. 1 is a block diagram of a travel planning system.

Referring to FIG. 1, a travel planning system (TPS) 10 includes a server type of computer system 12 that searches for airline tickets using so-called large scale or low-fare-search algorithms. The travel planning system 10 finds valid flight sequences between pairs of specified end-points in response to a query received from a client system. In one embodiment, the client 11 communicates with the server 12 via a network such as the Internet 14 through a web server 16. The process 18 of finding flight sequences for a portion of a trip is commonly called "scheduling." The process 18 uses flight information contained in travel information databases, 22. A particular flight sequence for a portion of a trip is commonly called an "itinerary." Typically, the travel-planning system attempts 10 to find prices for one or more combinations of itineraries from each portion of a trip. The process 30 of finding prices for a specific combination of itineraries (equivalently, sequence of flights on a ticket) is known as "pricing" a set of flights, or "pricing a ticket." The process of pricing 30 the flights of a ticket involves retrieving fares from a fare database 22, choosing fares for particular sub-sequences of flights such that all flights are paid for by exactly one fare, grouping fares into priceable-units, and verifying that the fare rules permit the particular choices of fares and priceable-units. In general, the priceable unit is a specific instance of the more general concept of a "sellable unit." Throughout the discussion below, priceable units will be used as an illustrative example; however, other types of sellable units could also be used. For example, sellable units can encompass portions of a priceable unit, or groups of priceable units, or other industry concepts that the technique would apply to.

The pricing process 30 can be extremely difficult as there are typically many different ways fares that can be assigned to flights and grouped into priceable-units. Moreover, the rule verification process used to determine if a fare can be used with an itinerary is very complex and time consuming. Furthermore, to find an inexpensive ticket the TPS 10 may have to price many different tickets (combinations of outbound and return itineraries).

The travel planning system 10 described generates multiple itineraries for each part of a trip and from the flights of each itinerary generates sub-sequences of flights called "faring-atoms" (FAs) to be used as the basis for fare-components. The process retrieves fares for each faring-atom, validates appropriate fare rules against the flights of the faring-atom, and if the fares "pass", the process produces fare-components, with each fare component being a combination of a fare with a faring-atom. The process combines fare-components into priceable-units, validating fare rules that restrict combinations of fares and flights within priceable-units and represents the set of valid priceable-units using a compact "factored" form including "priceable-unit-labels." The pricing process 30 uses the priceable-unit-labels and the itineraries to generate a context-free grammar (CFG) that represents all possible ways that the priceable-units can be combined to produce valid tickets.

These techniques may be used in travel planning systems such as that described by de Marcken in U.S. Pat. Nos. 6,295, 521, 6,275,808; 6,381,578; and 6,377,932. The techniques can also be used with other travel planning systems that have different system architectures (such as those that build tickets by combining cached travel units), as well as "pricing" systems that find prices for specific tickets (i.e., that find valid fare combinations for a specific flight sequence); or other travel applications.

A priceable-unit is a set of fare-components, each fare-component having a fare and associated flights that the fare pays for. As used in de Marcken, faring-atom refers to the set of flights within a fare-component. A travel planning system 10 or ticket pricing system (not shown) may as part of the process of finding prices for one or more possible tickets (flight sequences) generate a representation of valid priceable-units. As per de Marcken, one possible representation is as a set of priceable-unit-labels linked to priceable-unit-cores, where a priceable-unit-label is a factored representation of faring-atom combinations and a priceable-unit-core is a factored representation of fare combinations.

As an extended example, consider that TPS 10 is attempting to find prices for all round-trip tickets that can be constructed from the following itinerary possibilities:
Outbound MIA→SEA
1. MIA→SEA
2. MIA→ATL→SEA
Return SEA→MIA
1. SEA→MIA
2. SEA→ATL→MIA The above itineraries are for the purposes of this example presented in an abbreviated form. Generally, each flight would include specific time, airline and flight-number information. Thus, written more explicitly the second outbound itinerary might have two flights, AA621 MIA→ATL at 3 pm on May 17th, and AA1170 ATL→SEA at 5:30 pm on May 17th. Continuing the example, assume that the fare database provides the following:

| Market | Code | Tag | Price |
| --- | --- | --- | --- |
| MIA-SEA | Y | 1 | $500 |
| MIA-SEA | H | 2 | $300 |
| MIA-SEA | Q | 2 | $200 |
| ATL-MIA | Y | 1 | $500 |
| ATL-MIA | Q | 2 | $300 |
| ATL-SEA | F | 1 | $800 |
| ATL-SEA | Y | 1 | $400 |
| ATL-SEA | Q | 1 | $250 |

Continuing with the example, assume that the fare rules are such that the following priceable-units are the permitted combinations of flights and fares:

| PU type | Outbound Fare | fare-component Faring-atom | Return Fare | fare-component Faring-atom |
| --- | --- | --- | --- | --- |
| 1. One-Way | MIA-SEA Y | MIA->SEA | | |
| 2. One-Way | MIA-SEA Y | MIA->ATL->SEA | | |
| 3. One-Way | | | MIA-SEA Y | SEA->MIA |
| 4. One-Way | | | MIA-SEA Y | SEA->ATL->MIA |
| 5. One-Way | ATL-MIA Y | MIA->ATL | | |
| 6. One-Way | | | ATL-MIA Y | ATL->MIA |
| 7. One-Way | ATL-SEA Y | ATL->SEA | | |
| 8. One-Way | | | ATL-SEA Y | SEA->ATL |
| 9. One-Way | ATL-SEA F | ATL->SEA | | |
| 10. One-Way | | | ATL-SEA F | SEA->ATL |
| 11. Round-Trip | MIA-SEA H | MIA->SEA | MIA-SEA H | SEA->MIA |
| 12. Round-Trip | MIA-SEA Q | MIA->SEA | MIA-SEA Q | SEA->MIA |
| 14. Round-Trip | MIA-SEA H | MIA->SEA | MIA-SEA H | SEA->ATL->MIA |
| 15. Round-Trip | MIA-SEA Q | MIA->SEA | MIA-SEA Q | SEA->ATL->MIA |
| 16. Round-Trip | MIA-SEA H | MIA->ATL->SEA | MIA-SEA H | SEA->MIA |
| 17. Round-Trip | MIA-SEA H | MIA->ATL->SEA | MIA-SEA H | SEA->ATL->MIA |
| 18. Round-Trip | ATL-MIA Q | MIA->ATL | ATL-MIA Q | ATL->MIA |
| 19. Round-Trip | ATL-SEA Q | ATL->SEA | ATL-SEA Q | SEA->ATL |
| 20. Open-Jaw | MIA-SEA Q | MIA->SEA | ATL-SEA Q | SEA->ATL |
| 21. Open-Jaw | MIA-SEA Q | MIA->ATL->SEA | ATL-SEA Q | SEA->ATL |

Such a set of priceable-units can be compressed into a factored representation of priceable-unit-labels as per U.S. Pat. Nos. 6,295,521 and 6,381,578.

| | PU type | Outbound FAs | Return FAS | Fare-combinations |
| --- | --- | --- | --- | --- |
| A. | One-Way | {MIA->SEA, MIA->ATL->SEA} | | {<MIA-SEA Y>} |
| B. | One-Way | | {SEA->MIA, SEA->ATL->MIA} | {<MIA-SEA Y>} |
| C. | One-Way | {MIA->ATL} | | {<ATL-MIA Y>} |
| D. | One-Way | | {ATL->MIA} | {<ATL-MIA Y>} |
| E. | One-Way | {ATL->SEA} | | {<ATL-SEA Y>, <ATL-SEA F>} |
| F. | One-Way | | {SEA->ATL} | {<ATL-SEA Y> <ATL-SEA F>} |
| G. | Round-Trip | {MIA->SEA, MIA->ATL->SEA} | {SEA->MIA, SEA->ATL->MIA} | {<MIA-SEA H, MIA-SEA H>} |
| H. | Round-Trip | {MIA->SEA} | {SEA->MIA, SEA->ATL->MIA} | {<MIA-SEA Q, MIA-SEA Q>} |
| I. | Round-Trip | {MIA->ATL} | {ATL->MIA} | {<ATL-MIA Q>, ATL-MIA Q>} |
| J. | Round-Trip | {ATL->SEA} | {SEA->ATL} | {<ATL-SEA Q>, ATL-SEA Q>} |
| K. | Open-Jaw | {MIA->SEA, MIA->ATL->SEA} | {SEA->ATL} | {<MIA-SEA Q, ATL-SEA Q>} |

Each letter A-K represents one priceable-unit-label. The priceable-unit-labels compactly represent one or more priceable-units using lists of possible faring-atoms that each represent an independent choice.

Figure 2:
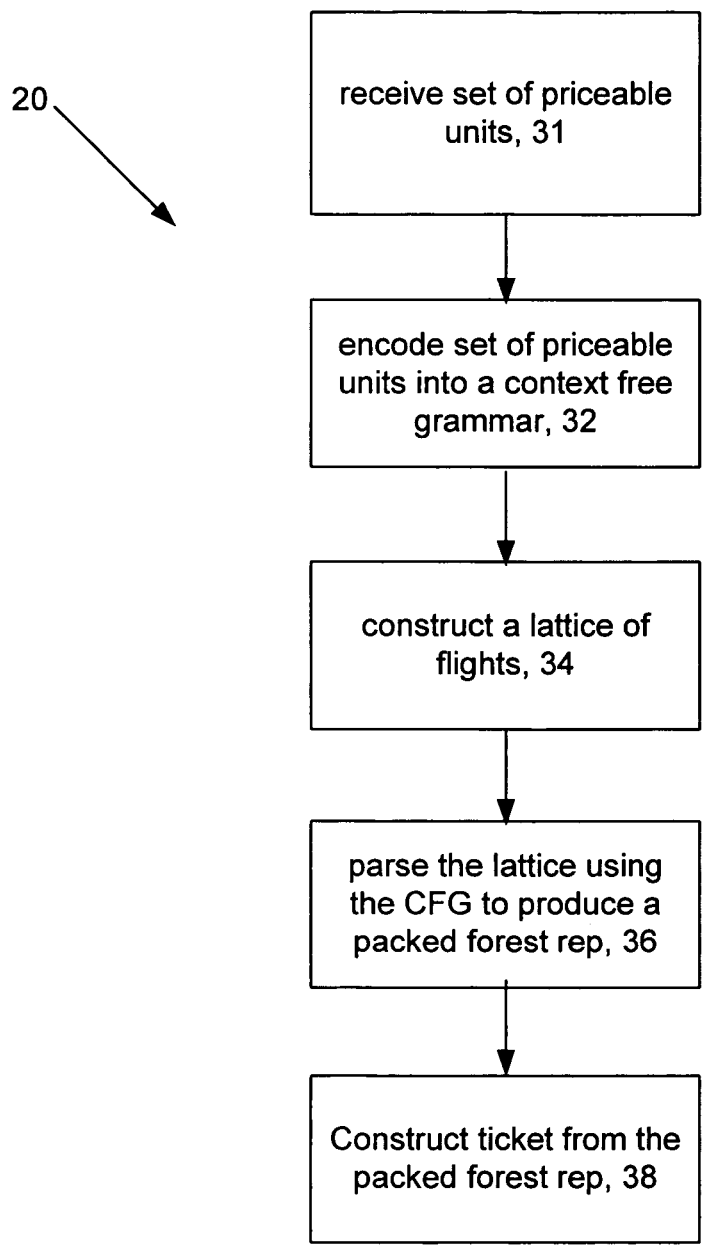
FIG. 2 is a flow chart showing a process to construct tickets and the like for travel planning.

Referring to FIG. 2, pricing process 30 provides valid prices for tickets. The pricing process 30 searches for one or more ways that the priceable-units can be chosen to cover every flight of a ticket exactly once. The possible flight sequences of a ticket are represented as a list of explicit flight combinations, or a list of sets of itineraries for each portion of a trip, or some other implicit or explicit representation. The possible priceable units are represented by a list of flight and fare combinations, or a list of priceable-unit-labels or some other implicit or explicit representation.

One embodiment of the pricing process 20 receives 31 a set of priceable-units, and encodes 32 the set into a context-free grammar (CFG) that represents possible ways that the priceable-units can be combined to produce valid tickets. Context-free grammars take the form of a list of "rewrite rules" or "productions" that are typically written "A==>B C." The rule has the meaning that the "non-terminal symbol" "A" expands into the symbol "B" followed by the symbol "C." Typically, a grammar has a distinguished "root" symbol that represents the starting point for the generation of a sequence of symbols. To expand a context free grammar a process starts with the root symbol and successively replaces all non-terminal symbols with one of their expansions until only terminal symbols remain (symbols with no expansions). A context-free grammar can be used to "parse" a symbol sequence. That is, there are algorithms that, given a grammar and a sequence, will determine whether the sequence can be produced by the grammar and if so will produce one or more "parse trees" for the sequence. A parse tree is a graphical description of the expansions that generate the sequence.

There is often more than one way to parse a sequence, and typical parsing algorithms output a representation of all possible parses called a "packed parse forest" that is a directed acyclic graph made up of "AND" nodes and "OR" nodes. Sometimes parse algorithms are applied to multiple sequences at once, represented as a directed graph called a "lattice" or "trellis." In such a situation the output, i.e., the packed parse forest representation represents all of the possible parses of the entire possible symbol sequences.

In some embodiments, the pricing process constructs 34 a lattice of flights that represents permitted flight combinations for a ticket, and parses 36 the lattice using the context-free grammar to produce a "packed parse forest" representation of all the valid priced tickets (combinations of flights and fares). A "packed parse forest" representation can be produced by dynamic-programming context-free grammar parsing algorithms such as Earley's algorithm or the CKY algorithm.

A packed parse forest representation is a form of an AND/OR graph representation and thus can be easily translated into a "pricing-graph" representation described by de Marcken (U.S. Pat. No. 6,275,808). As described in U.S. Pat. No. 6,275,808, many useful operations can be performed on an AND/OR representation, such as extraction of the cheapest or most convenient priced tickets. From the packed forest representation, the process 20 can produce tickets by using analogous extraction techniques discussed below.

The CFG based pricing process 20 is based in part on standard dynamic programming algorithms for parsing a lattice using a context-free grammar (CFG). Context-free grammars are often used in the domain of natural (human) language processing and speech recognition.

Figure 3:
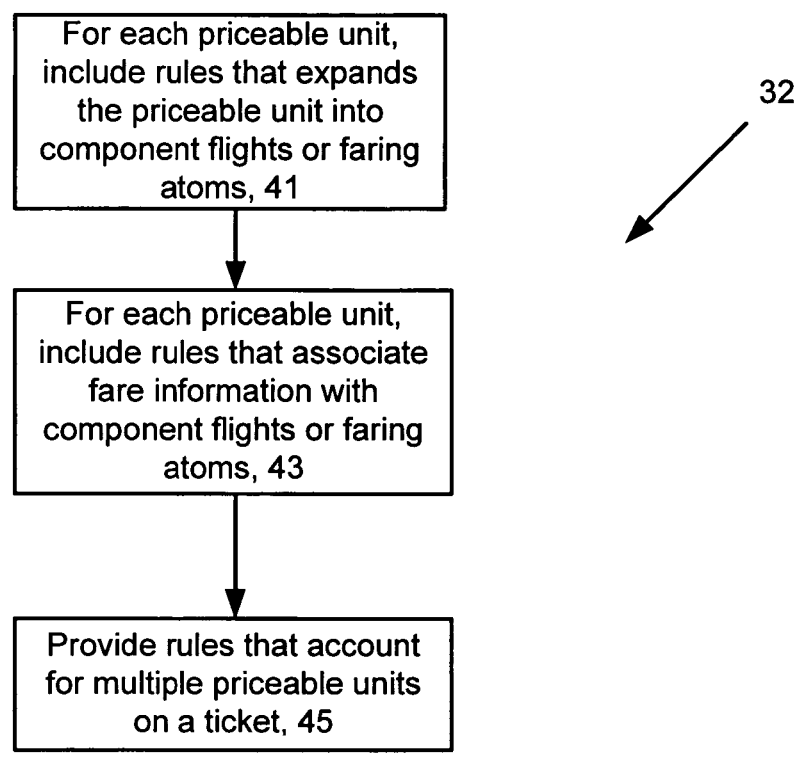
FIG. 3 is a flow chart showing a process to construct context free grammars for constructing tickets.

Referring to FIG. 3, the process 32 to translate or encode priceable-units into a grammar is shown. Different pricing systems may represent priceable-units in different ways. While in some embodiments process 32 would determine the representation used; in other embodiments, the particular form of process 32 would depend on the pricing system and would be "hard coded" to the priceable-unit representation that the pricing system used. Different representations of PUs can be used such as an "explicit" form in which each PU is represented as a list of faring atoms, and each faring atom as a list of flights and a second implicit form where PUs are factored into priceable-unit labels.

Process 32 operates on the received set of priceable-units. For each priceable unit the process 32 includes 41 rules that expand the priceable unit into its component flights or faring atoms, as appropriate, e.g., depending on the representation used for the priceable units. For each of the priceable units the process includes 43 rules that associate fare information with component flights or faring atoms. The process 32 also provides rules 45 that account for multiple priceable units on a ticket.

In one embodiment, the priceable units are received as a list $P[1] \ldots P[N]$, where each priceable-unit $P[i]$ has one to four faring-atoms $FA[i][1] \ldots FA[i][n[i]]$, where $n[i]$ is the number of fare-components in priceable-unit i (typically 4 or less), and a set of fares $Fares[i]$. The process 32 builds a context-free grammar from the set of priceable-units that expresses the valid tickets that can result from combining one or more priceable-units from the set.

The process 32 builds the context-free grammar of rules. That is, for each input priceable unit $P[i]$, process 32 adds a rule of the form:

$P[i]==>FA[i][1] \ldots FA[i][n[i]]$

The context-free grammar rule expresses a relationship that the priceable-unit $P[i]$ produces a sequence of faring-atoms $FA[i][1] \ldots FA[i][n]$.

As discussed below, pricing information is associated with the grammar and a ticket is built 38 (FIG. 2) from one or more priceable-units, as:

```
Ticket ==> S
S     ==> P S | <empty>
P     ==> P[1] | P[2] | ... | P[N]
```

A variation can occur where the priceable unit is represented by faring atoms. The CFG has added rules to expand the faring-atoms into their component flights, so that the grammar represents tickets as sequences of flights. This is accomplished by adding a rule for each faring-atom $FA[k]$ of length $L[k]$: as $FA[k]==>Flight[k][] \ldots Flight[k][L[k]]$.

Another variation is where the priceable units are represented in some form other than as an explicit list. If the set of priceable-units is represented in some manner other than an explicit list, then the grammar takes an altered form. In one embodiment, the pricing process 20 represents priceable-units as priceable-unit-labels. If each priceable-unit-label $Q[i]$ has a set of possible faring-atoms $FAS[i][1] \ldots FAS[i][n[i]]$ for each of its $n[i]$ parts, with individual faring-atoms indexed $FA[i][j][1] \ldots FA[i][j][m[i,j]]$ where $m[ij]$ is the number of faring-atom possibilities for the j'th fare-component of priceable-unit-label i, then process 32 generates a revised grammar of the form:

```
Ticket ==> S
S     ==> Q S | <empty>
```

-continued

```
Q     ==> Q[1] | Q[2] | ... | Q[N]
 (1 fare-component)
    Q[i] ==> FAS[i][1]
 (2 fare-component)
    Q[i] ==> FAS[i][1] FAS[i][2]
 (3 fare-component)
    Q[i] ==> FAS[i][1] FAS[i][2] FAS[i][3]
 (4 fare-component)
    Q[i] ==> FAS[i][1] FAS[i][2] FAS[i][3] FAS[i][4]
FAS[i][j] ==> FA[i][j][1] | FA[i][j][2] | ... | FA[i][j][m]
```

The context-free grammars described above generate pricing units in which the fare-components of a priceable-unit appear consecutively, with no intervening fare-components from other priceable-units. Thus, they can generate price units of the form (A' A" B' B") but not (A' B' B" A"), (where the symbol "'" indicates the first fare-component of a priceable-unit and "''" the second). An alternative way to handle non consecutive fare-components is discussed below.

Context-free grammars of the particular form described here are known in formal language theory as "Dyck grammars." Dyck grammars generate sequences of properly matched parentheses (in this case, one type of parenthesis per priceable-unit, with the analogy that the first faring-atom of a priceable-unit corresponds to an open parenthesis and the last to a close parenthesis).

It is possible to provide a grammar to support non-consecutive fare-components by allowing an arbitrary number of priceable-units (represented by the non-terminal S) to appear between every fare-component of a priceable-unit. This requires modifying the priceable-unit rules for priceable-units of two or more fare-components, as follows:

P[i]==>FA[i][1] S FA[i][2] S . . . S FA[i][n[i]]
and
Q[i]==>FAS[i][1] S FAS[i][2] S . . . S FAS[i][n[i]].

Summarizing, the eleven priceable-unit-labels given in the example above are translated into a context free grammar (CFG) as follows:

```
Ticket ==> S
S     ==> Q S | <empty>
Q     ==> QA | QB | QC | QD | QE | QF | QG | QH | QI | QJ | QK
QA    ==> FAS1
QB    ==> FAS2
QC    ==> FAS3
QD    ==> FAS4
QE    ==> FAS5
QF    ==> FAS6
QG    ==> FAS1 S FAS2
QH    ==> FAS7 S FAS2
QI    ==> FAS3 S FAS4
QJ    ==> FAS5 S FAS6
QK    ==> FAS1 S FAS6
FAS1  ==> FA1 | FA2
FAS2  ==> FA3 | FA4
FAS3  ==> FA5
FAS4  ==> FA6
FAS5  ==> FA7
FAS6  ==> FA8
FAS7  ==> FA1
FA1   ==> MIA->SEA
FA2   ==> MIA->ATL ATL->SEA
FA3   ==> SEA->MIA
FA4   ==> SEA->ATL ATL->MIA
FA5   ==> MIA->ATL
FA6   ==> ATL->MIA
FA7   ==> ATL->SEA
FA8   ==> SEA->ATL
```

The flight sequence MIA→ATL→SEA→ATL→MIA can be generated in several ways by the above grammar. Each set of expansions that results in this flight sequence can be represented by a parse tree that corresponds to a particular combination of priceable-units.

In the example above, the non-terminal symbol "QG" represents the priceable-unit-label G, and is therefore linked with the single combination of two fares <MIA-SEA H> and <MIA-SEA H> whereas, the non-terminal symbol "QE" represents the priceable-unit-label "E", and is therefore linked with the choice of two one-fare combinations, <ATL-SEA F> or <ATL-SEA Y>}

Figure 4A:
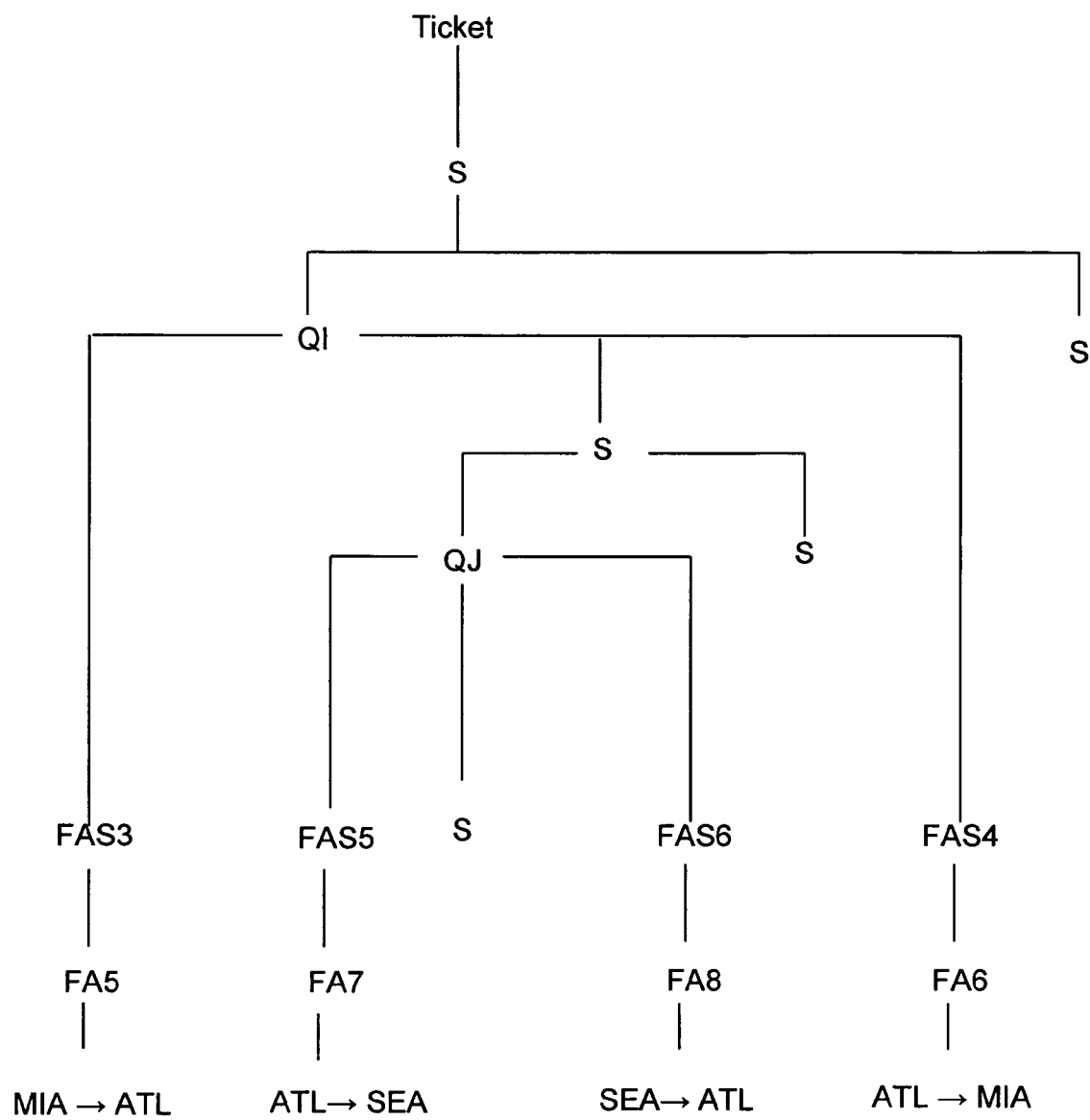
FIGS. 4A, 4B and 5A are diagrams depicting parse tree structures.
Figure 4B:
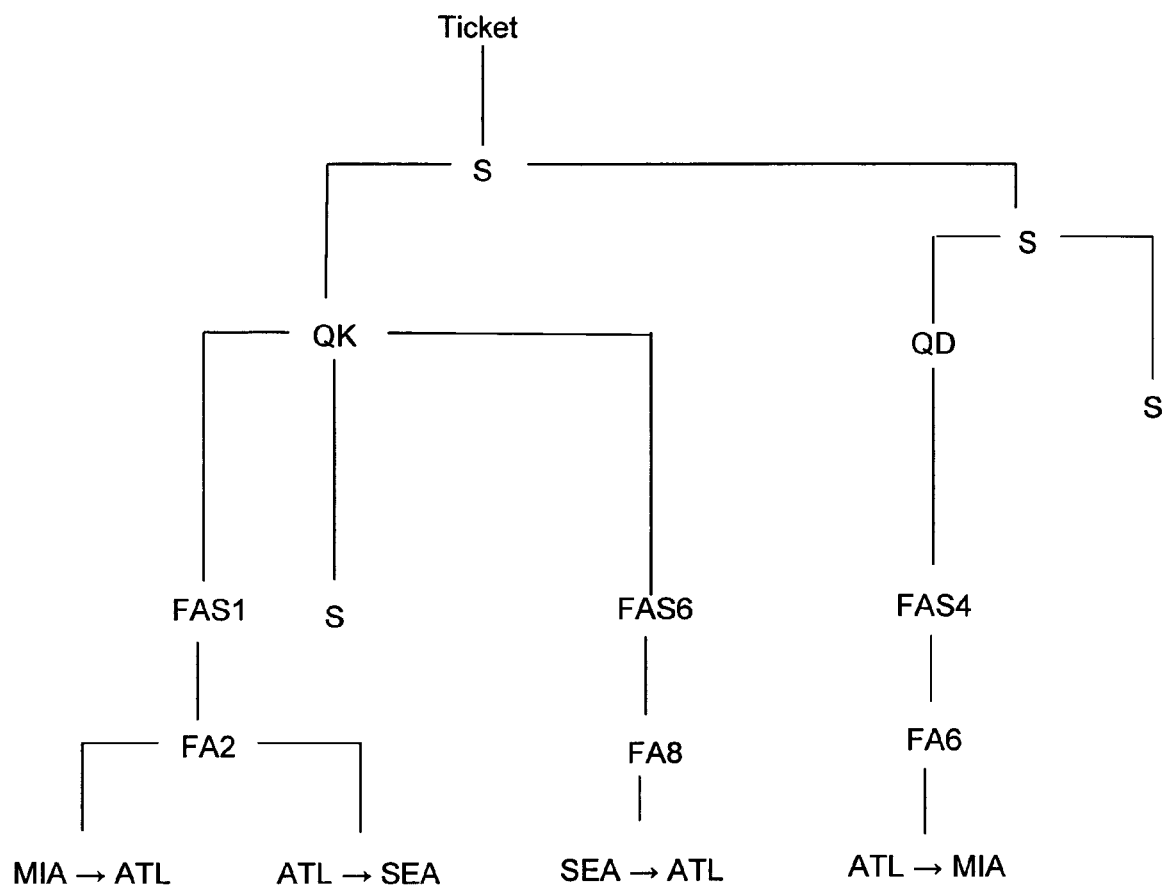

Referring to FIGS. 4A and 4B, one example of a parse tree that represents a pricing using two round-trip priceable-units from priceable-unit-labels I and J, and a second parse tree that represents a pricing using an open-jaw priceable-unit and a one-way priceable-unit from priceable-unit-labels D and K is shown. Some travel planning systems may be capable of representing priceable-units in a more compact fashion than priceable-unit-labels. Such representations include representing multiple faring-atoms using a directed graph (or equivalently, regular expression) of flights. Another way is representing multiple priceable-unit-labels using a directed graph of faring-atom sets (for example, priceable-unit-labels G and K are collapsed, sharing the outbound faring-atom sets). Another technique uses some combination of the above representations.

A context-free grammar can encode any regular expression (equivalently, directed graph). Thus, all of the alternative representations of priceable-units is accommodated using the context-free grammar technique described.

The context-free grammars described above are sufficient to generate the most common types of tickets. However, they cannot generate tickets with crossed priceable-units, such as of the form A' B' A" B" which may arise in especially complicated trips. These constructions do not have the Dyck language property of corresponding to a set of properly matched parentheses, and it is a fundamental limitation of context-free grammars that they cannot express the set of valid tickets if such constructions are included. However, various techniques can be used for extending context free grammars (CFGs) to account for non-context-free phenomena such as crossed components.

Figure 5:
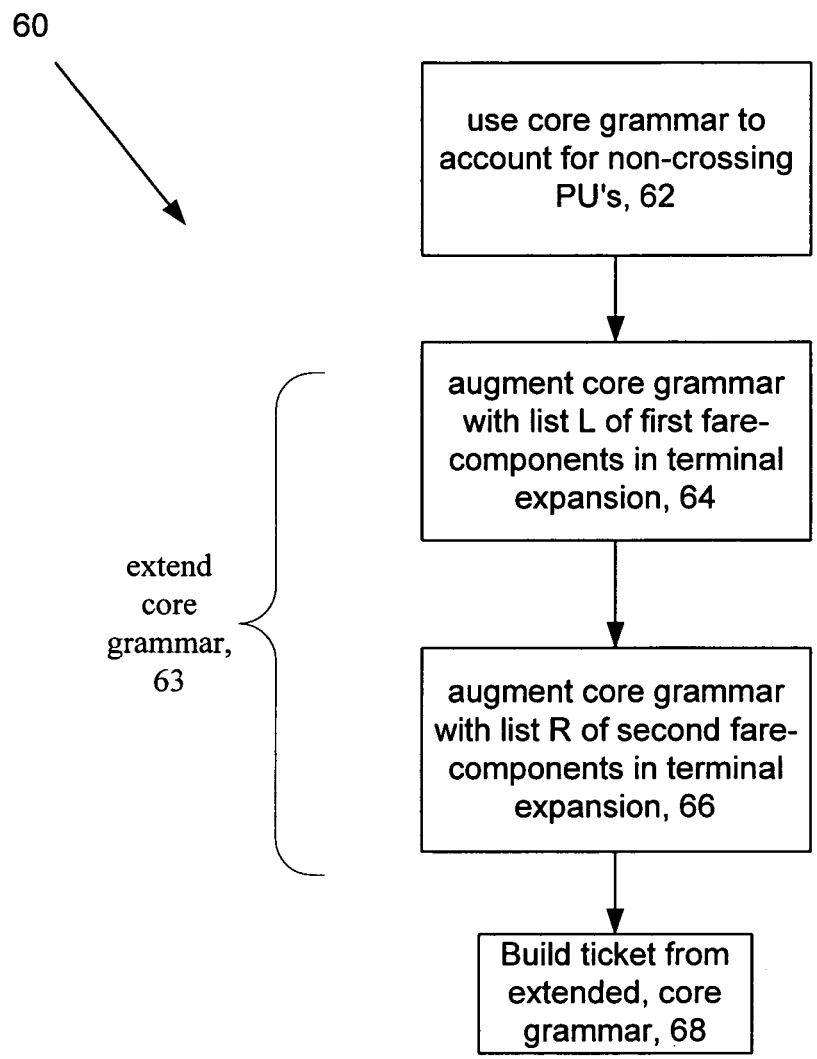
FIGS. 5-7 are flow charts depicting additional processes used in construction of tickets.

Referring to FIG. 5, an extension 60 for generating tickets for non-context-free price units is shown. One process 60 to generate tickets with crossed priceable-units uses 62 a core grammar as described above in FIG. 3 to account for a "planar" (non-crossing) subset of the priceable-units on a ticket that collectively obey the Dyck language property of matching parentheses without crossing. The process 60 extends this core grammar with a special mechanism that accounts for remaining "crossing" priceable-units (those that cross one or more of the planar sub-set).

An example for such an extension is described for the case where priceable-units contain at most two fare-components. To extend the core grammar, each grammar non-terminal is augmented 64 with a set L, where L represents the set of crossing priceable-units whose first fare-component appears within the non-terminal's expansion, and augmented 66 with a set R, where R represents the set of crossing priceable-units whose second fare-component appears within the non-terminal's expansion. The extended grammar is used to generate 68 a ticket. The extended grammar is:

```
Ticket        ==> S<{ },{ }>
S<L,R>        ==> P<L1,R1> S<L2,R2>
    where L = L1+L2−R2
          R = R1+R2−L1
S<{ },{ }>    ==> <empty>
P<L,R>        ==> P[1]<L,R>
              ==> P[2]<L,R>
              ...
              ==> P[N]<L,R>
```

For each one fare-component priceable-unit:
P[i]<{ },{ }>==>FA[i][1]
For each two fare-component priceable-unit:
P[i]<L,R>==>FA[i][1] S<L,R>FA[i][2]
P[i]<{i},{ }>==>FA[i][1]
P[i]<{ },{i}>==>FA[i][2]
where here { } represents the empty set.

Figure 5A:
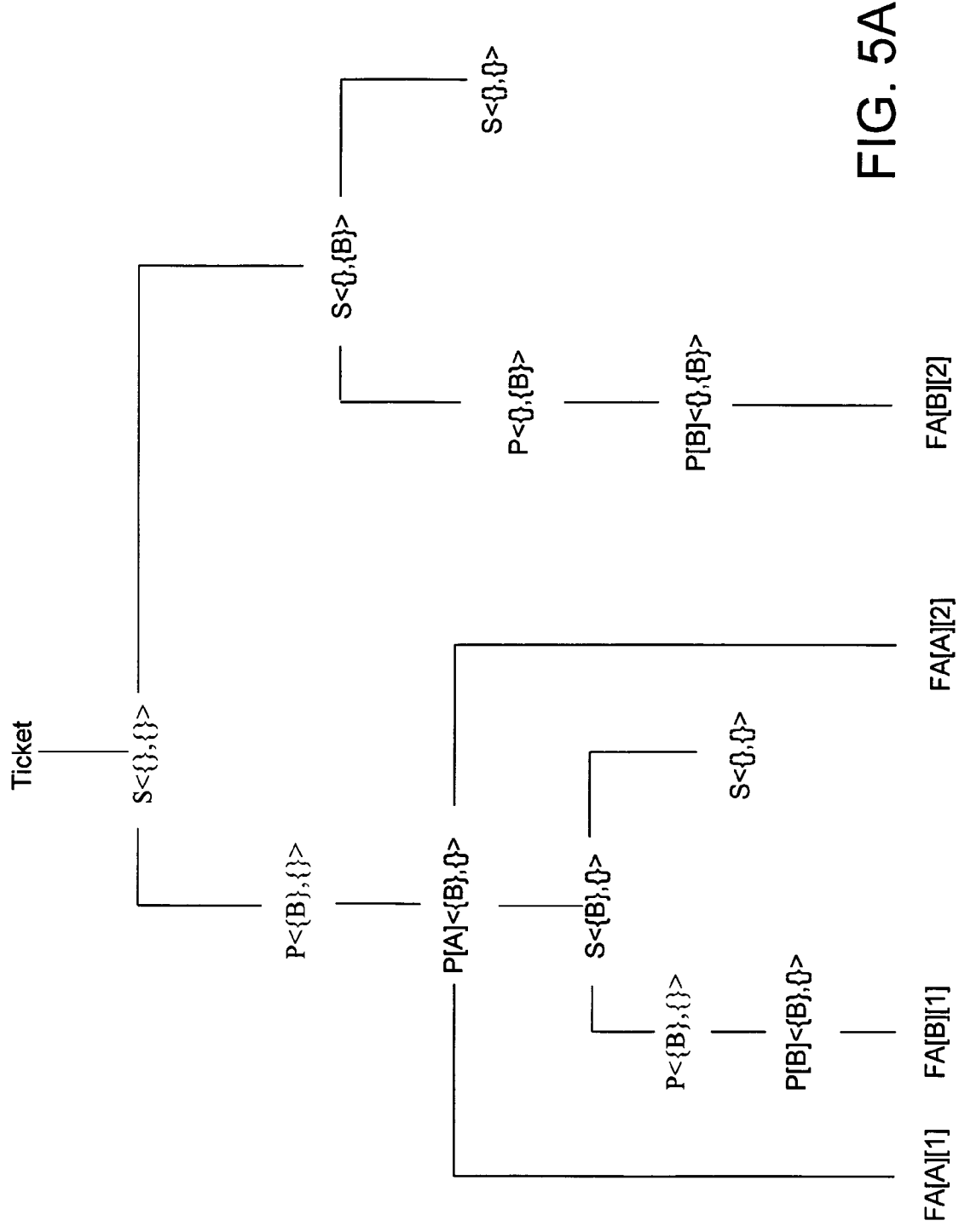

FIG. 5A shows an example of a tree for generating a ticket of the form A' B' A" B" where two two-fare-component priceable-units exist, A (with faring-atom A'=FA[A][1], A"=FA[A][2]) and B (with faring-atom B'=FA[B][1] and B"=FA[B][2])

In FIG. 5A, the A priceable-unit is accounted for by the core grammar and the B priceable-unit, which crosses the A, is handled by the L and R extensions. This grammar needs only maintain non-empty L and R sets for tickets with crossing priceable-units. Thus, for the majority of tickets that arise in practice, such sets will be empty.

The grammar can generate the same ticket in more than one way. For instance, there may be more than one derivation of the same set of priceable-units. In the example, a second derivation is possible in which the B priceable-unit is accounted for by the core context free grammar, and the A priceable unit is accounted for by extensions to the core context free grammar. This ambiguity is not a problem for most applications, and can be reduced by using more complicated grammars that limit the situations in which the extensions are used.

Such complicated grammars extended with sets in this way are often referred to as "attribute" or "unification" grammars. It is typically necessary to limit the size of the sets to insure that parsing and generation algorithms can efficiently manipulate such grammars. Since the majority of tickets that arise in practice have only a small number of crossing priceable-units, it is quite practical to limit the size of the L and R sets to one or two priceable-units.

Referring back to FIG. 3, the process 32 thereafter associates 43 the price information with the context-free grammar. Price information (such as fares) is associated 43 with the grammar using standard techniques for compiling programming languages or attaching semantic information to natural language grammars. Price information (such as fares) is associated with the grammar by linking the price information with non-terminal priceable-unit symbols in the grammar representations of the priceable-unit's fares (either a list, or in the case of the priceable-unit-labels and priceable-unit-cores representation of de Marcken (U.S. Pat. No. 6,381,578), the factored priceable-unit-core representation).

The application of the context-free grammars described here to the "pricing" of a particular ticket is straightforward and analogous to parsing a computer program using the appropriate computer language grammar or parsing a sentence using a natural language grammar. Standard context-free parsing algorithms may be used, such as Earley's algorithm or the CKY algorithm. These algorithms are efficient, and can be implemented in highly optimized forms for the particular Dyck language grammars described. Parsing algorithms that can process the extended grammars used to account for crossing priceable-units are well known and often referred to as unification parsers.

Figure 6:
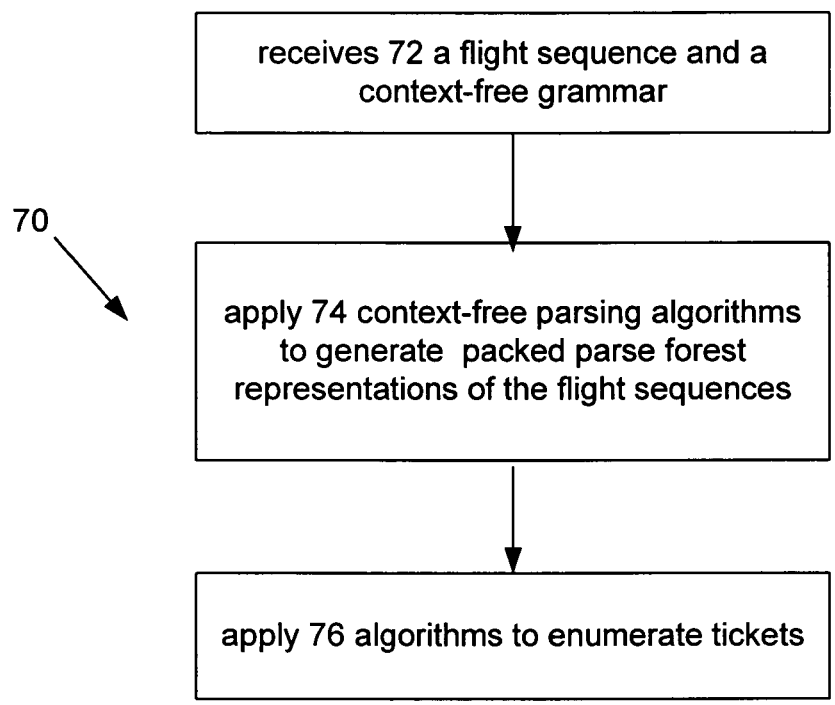

Referring to FIG. 6, a parsing process 70 to process flight sequences using grammars is shown. Typically, context-free parsers operate over a finite sequence of symbols ("terminals"). For the grammars described, the terminals of the grammars described are either faring-atoms or flights, though in most cases flights may be preferred. In the example, "flights" will be used, with the understanding that other units such as "faring-atoms" or "legs" can be substituted for flights.

The process 70 receives 72 a flight sequence and a context-free grammar generated as described above. Process 70 applies 74 standard context-free parsing algorithms to generate packed parse forest representations of the flight sequences, i.e., compact representations that represent all possible parses of the flight sequence into priceable-units. A packed parse forest representation is a form of an AND/OR graph representation and thus can be easily translated into the "pricing-graph" representation described by de Marcken (U.S. Pat. No. 6,275,808), where the pricing-graph includes the fares associated with each priceable-unit. The process 70 applies 76 enumeration algorithms to the packed parse forest representations (or a pricing-graph,) to enumerate priced tickets (assignments of flights to fares and priceable-units) (see de Marcken U.S. Pat. No. 6,275,808).

Alternatively, slightly simpler context-free parsing algorithms exist that do not explicitly construct packed parse forest representations but rather directly generate parses, such as the Viterbi formulation of context-free parsing. Such algorithms can be used to directly price tickets.

Figure 7:
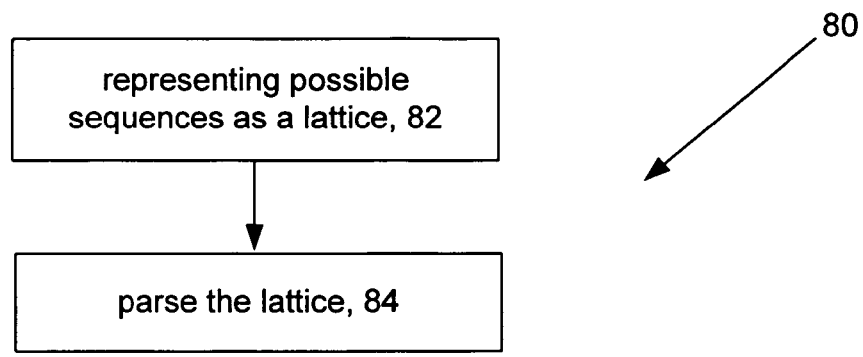

Referring to FIG. 7, pricing 80 multiple ticket possibilities with context-free grammars is shown. Travel planning systems, as opposed to "pricing" systems, commonly examine many possible flight sequences for a trip. Some travel planning systems consider a set of itineraries (flight sequences) for each part of a trip, such that a complete ticket is found by choosing one itinerary from each set (de Marcken (U.S. Pat. No. 6,295,521)). In many of these systems, the choice of flight sequences that make up a ticket can be represented as a directed graph of flights. It is well known that standard context-free parsing algorithms can be easily modified to parse directed graphs, or as they are more usually known in the context of parsing, input lattices.

Pricing 80 multiple tickets with context-free grammars includes representing 82 possible flight sequences as a lattice and parsing 84 the lattice to produce a packed parse forest representation. In the case of a choice of itineraries for each part of a trip, the choice of ticket flights can be represented by a flight lattice of the form:

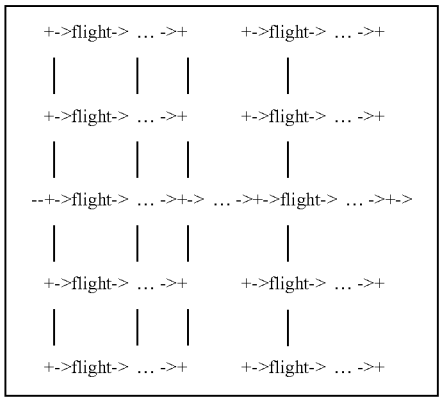

For the example trip, the flight lattice is:

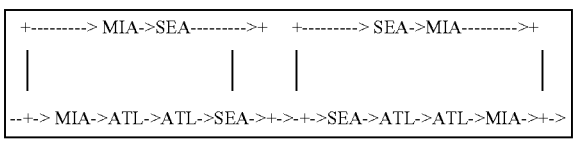

Some flight scheduling systems may be able to generate directed graphs of flights in other formats; this would especially be the case if the flight database are stored as a directed graph, or if standard dynamic-programming based search algorithms such as Dijkstra's shortest-path algorithm are used to search for flight paths between trip endpoints.

Some travel applications, including TPSes, may construct a table of priceable-units without constructing itineraries or other explicit representations of the permitted flight sequences between trip endpoints. In such cases, it may still be desirable to be able to find the valid ways of combining priceable-units to produce tickets for a trip. This may arise in the following situation, among others:

A first travel planning system queries a second travel planning system off-line to generate a diversity of tickets (valid combinations of flights and fares grouped into priceable-units) for various locations and times, and then stores the tickets' component priceable-units in a database. Then, when responding to a query for a trip between specific points at specific times, the first travel planning system combines the flights and fares of one or more cached priceable-units to produce a valid ticket that satisfies the query. One advantage of such an arrangement is that the potentially expensive operation of constructing and validating priceable-units is avoided at "on-line" query time.

In this situation, the first travel planning system can construct a priceable-unit grammar by translating priceable units into grammars (FIG. 2), but the pricing algorithms are not directly applied to generate tickets, as they are based on parsing a sequence or lattice of flights that represents the flight sequences that satisfy the query, and the first travel planning system has not constructed such a sequence or lattice.

As constructed, the grammar does not encode all physical flight constraints, such as the non-overlap of flight times and the necessity of connecting from one flight to the next. In addition, the grammar does not encode constraints that arise from the query, such as the necessity of departing and arriving particular airports at particular times. Neither of these are issues when parsing algorithms are applied to flight sequences or lattices, as the sequences and lattices can encode these constraints. For example in the example above, the grammar does not encode the fact that a single ticket cannot simultaneously include both MIA→ATL and MIA→SEA, as this is already accounted for by the exclusive choice between two outbound itineraries (MIA→SEA and MIA→ATL→SEA), as expressed in the input flight lattice.

However, there are at least three ways that a TPS with a priceable-unit grammar but no flight lattice can generate priced tickets. First, a lattice of flights can be generated solely for the purpose of parsing, that includes the flights found in the priceable-units' faring-atoms and encodes the goals of providing travel between the query origins and destinations at those times specified in the query, as well as natural constraints on flights such as non-overlap of flight times and the necessity of connecting from one flight to the next. One way to do this is to run a flight-scheduling program using a database of the flights found in the priceable-units.

A second technique generates representations of legal flight sequences by using a flight-scheduling program using an independent flight database.

A third technique augments the grammar such that the grammar encodes the physical constraints and the query constraints. These "finite state" constraints on valid flight sequences can both be expressed as regular expressions over flights, and standard algorithms exist to produce a new context-free grammar for a language that is the intersection of a particular context-free grammar with one or more regular expressions. Given such an augmented grammar, valid tickets can be produced by enumerating flight sequences from the grammar. Enumerating flight sequences is accomplished by eliminating recursive symbols from the grammar and performing a standard depth-first enumeration on the augmented grammar.

Thus, the application of priceable-unit grammars is not limited to situations in which flight sequences or lattices are parsed.

Parsing algorithms such as Earley's algorithm process specialized grammar forms such as those for Dyck languages extremely efficiently, but for grammars with especially simple forms it is frequently advantageous to develop specialized parsing procedures for those grammars. When this is done it is often not necessary to explicitly build representations of the grammars, as the grammars are encoded directly into the parsing procedure. For these reasons certain embodiments may not explicitly build grammars or explicitly invoke standard context-free parsing algorithms. However some embodiments will use dynamic programming or "memoization" techniques to build representations of how sub-sequences of flights or faring-atoms can be paid for with fares in a manner that is equivalent to the application of a parsing procedure.

The ticket grammars have very few non-terminal symbols (those symbols that appear on the left hand side of rules). In particular, the grammars used in the embodiments described here have only two primary non-terminal symbols, S and P (or Q), where P (or Q) represents a single priceable-unit with others possibly interspersed between its fare-components, and S representing a sequence of one or more priceable-units. This simple form permits highly optimized parsing algorithms.

Exemplary pseudo-code is provided below for implementing a parsing algorithm, where the algorithm does not include the extensions necessary for "crossing" priceable-units.

Assumptions and notation in the pseudo code include:

An input lattice of flights is provided. Variables i, j, k and l are used to refer to vertices in the input lattice of flights. The set of vertices that succeed variable i in the lattice is written successor(i); if the input lattice is a simple flight sequence indexed by position, then j is in successor(i) if and only if j>i. The start vertex of a faring-atom FA is written start(FA) and the end vertex is written end(FA). The variable p is used to index priceable-units and the variable f is used to index fare-components within a priceable-unit. Each priceable-unit P[p] includes one or more faring-atoms FA[p][f], where f ranges from 1 to n[p], and some representation of fares FARES[p].

The output of the algorithm is a packed parse forest built from ANDs and ORs with flights and faring-atoms as terminals. That is, it is a type of pricing-graph (see de Marcken U.S. Pat. No. 6,275,808) from which particular tickets can be extracted. The algorithm maintains two tables, table P[i,j] and table S[i,j]. Table P[i,j] holds a sub-graph representing all possible ways in which a single priceable-unit can cover those flights between vertices i and j, possibly with other priceable-units intervening between fare-components. Thus, table P[i,j] corresponds to the ways in which the grammar symbol P can expand to the flights between i and j. Table S[i,j] holds a sub-graph representing all possible ways in which a sequence of priceable-units can cover those flights between i and j. Thus table, S[i,j] corresponds to the ways in which the grammar symbol S can expand to the flights between i and j. In addition, a table PU[i,j] is used to hold those priceable-units whose first faring-atom starts at vertex i and whose last vertex ends at vertex j.

The pricing-graph is computed by calling COMPUTE_PRICING_GRAPH with the first and last vertex of the lattice.

Pseudo-code:

```
COMPUTE_PRICING_GRAPH(first_lattice_vertex,
last_lattice_vertex)
{
    initialize P[i,j] to 'uncomputed'
    initialize S[i,j] to 'uncomputed'
    initialize PU[i,j] to { }
    for each priceable-unit p {
        PU[start(FA[p][1]), end(FA[p][n[p]])] += p
    }
    return COMPUTE_S(first_lattice_vertex, last_lattice_vertex)
}
COMPUTE_S(i,j)
{
    if S[i,j] != 'uncomputed'
        return S[i,j]
    result = { }
    g = COMPUTE_P(i,j)
    if (g != 'none')
        result += g
    for k in successor(i) where j in successor(k) {
        g1 = COMPUTE_S(i,k)
        g2 = COMPUTE_P(k,j)
        if (g1 != 'none' and g2 != 'none')
            result += AND(g1, g2)
    }
    if (size(result)) > 0
        S[i,j] = OR(result[1],...,result[size(result)])
    else
        S[i,j] = 'none'
    return S[i,j]
}
COMPUTE_P(i,j)
{
    if P[i,j] != 'uncomputed'
        return P[i,j]
    result = { }
    for each p in in PU[i,j] {
```

Pseudo-code:

```
        Ss = { }
        FAs = { }
        for f from 1 to n[p] - 1 {
            k = end(FA[p][f])
            l = start(FA[p][f+1])
            if (k != l) {
                if (k in successor(l)) {
                    g = COMPUTE_S(k,l)
                    if (g = 'none')
                        goto next_PU
                    else
                        Ss += g
                }
                else
                    goto next_PU
            }
        }
        for f from 1 to n[p] {
            FAs += FA[p][f]
        }
        result +=
            AND(FARES[p], Ss[1],...,Ss[size(Ss)], FAs[1],...,FAs[n[p]])
    next_PU:
    }
    if (size(result)) > 0
        P[i,j] = OR(result[1],...,result[size(result)])
    else
        P[i,j] = 'none'
    return P[i,j]
}
```

For applications in which only a small number of tickets are to be generated, such as when only the cheapest ticket is desired, it is not necessary to build a packed parse forest. Standard parsing algorithms, or a specialized algorithm such as that given above, can be modified to maintain tables of prices or other values and to store for a sub-sequence of flights only the parse tree that results in the best value, or a small number of parse trees that result in good values. Such modifications are typically called Viterbi implementations.

One benefit of this technique is that the algorithms provide an efficient (fast, polynomial time) way to find one, many or all of the ways in which flights and fares can be combined to produce valid tickets for a query. In most cases, there are large numbers of such combinations because the number of combinations grows exponentially with the length of the ticket.

Therefore, brute-force search techniques perform very poorly, especially for large tickets. In contrast, the algorithms described above produce packed parse forest representations of this exponential number of possibilities in fast polynomial time, from which the best answers can be extracted using algorithms such as the pricing-graph solution enumeration algorithms of de Marcken (U.S. Pat. No. 6,275,808).

The efficiency of the above-described techniques reflects the efficiency of context-free grammar parsing routines. These routines achieve efficiency because they are based on dynamic programming. Worst-case parsing time for context-free grammars using algorithms such as Earley's algorithm are proportional to cube of the length of the input sequence or lattice and quadratic in the size of the grammar. But, the particular Dyck language grammars discussed above are processed generally more efficiently, usually in time proportional to the quadratic in the length of the ticket and linear in the size of the grammar.

The algorithm described in de Marcken et al (U.S. Pat. No. 6,295,521, column 33, titled "Linking Itineraries") for constructing a pricing-graph from priceable-unit-labels and itineraries is also based on dynamic programming. The de Marcken (U.S. Pat. No. 6,295,521) algorithm accumulates "open" priceable-unit information from the start of a ticket to each subsequent point and stores the open priceable unit information in tables called "slice-label-sets" and "open-label-sets." As a consequence, half-way through a ticket of the form A' B' C' D' E' E" D" C" B" A" (composed of 5 round-trip priceable-units) the de Marcken (U.S. Pat. No. 6,295,521) algorithm maintains the complete set "ABCDE" of priceable units. Thus, the number of such sets of priceable units grows exponentially with the size of the ticket. The CFG techniques described above recognize that most tickets obey the context-free Dyck language properties and consequently can be processed more efficiently, as discussed above.

The context-free grammar technique disclosed constructs priceable-unit information from the inside out (for subsequences of flights that need not start at the start of the ticket) and thus does not need to maintain a large set of open priceable-units for tickets of this sort. For this reason the context-free grammar algorithm described here can be substantially more efficient than the de Marcken (U.S. Pat. No. 6,295,521) algorithm.

A number of embodiments of the invention have been described. Nevertheless, it will be understood that various modifications may be made without departing from the spirit and scope of the invention. For instance, the discussion above assumes that the grammar is based on priceable-units. However any other unit of travel that can be put together to form tickets could form an alternative basis for the grammar. One useful embodiment substitutes complete tickets for priceable-units; this is especially useful for the application described previously wherein one or more cached tickets are combined to produce new tickets.

It is well known that any given context-free grammar can be re-expressed in alternative forms that are equivalent; thus, the grammars given above should not be considered the only form that can be constructed. An example of a simple grammar transformation that may lead to more advantageous implementation is conversion of the grammar to "Chomsky normal form" or other forms in which each rule has at most two symbols on the right hand side of rules. It is well known that various simpler parsing algorithms can be used for grammars of this sort. It is well known that context-free grammars are equivalent to various other formal specifications of languages, such as push-down automata. It is also well known that many different efficient context-free parsing algorithms exist, and that grammars can be "compiled into" parsing algorithms, a standard optimization technique frequently used in programming language compilers that avoids the step of explicitly building the grammar. Furthermore, as is well known, many efficient context-free parsing algorithms are equivalent to recursive brute-force parsing formulations augmented with function memoization. For these reasons it will be understood by those familiar with context-free languages and processing techniques that many superficially dissimilar embodiments of this invention are possible that share the same fundamental structure—that of using dynamic programming based on the context-free structure of priceable-units. Accordingly, other embodiments are within the scope of the following claims.

What is claimed is:

1. A computer implemented method of pricing a sequence of transportation units, the method comprising:
    receiving, by one or more computers, a set of sellable-units, each sellable unit comprising one or more flight segments and at least one fare associated with the one or more flight segments;
    expanding, by one or more computers, the set of sellable units into components;
    identifying the components that include a crossed combination of priceable units such that a first flight associated with a first priceable unit departs prior to a first flight associated with a second priceable unit, and the first flight associated with the second priceable unit departs prior to completion of a last flight associated with the first priceable unit;
    translating, by one or more computers, the components of the expanded set of sellable-units that do not include a crossed combination of priceable units into a context-free grammar that is stored on a computer readable medium, the context free grammar representing combinations of the sellable-units;
    producing, by one or more computers, a parse tree that corresponds to combinations of sellable-units;
    parsing, by one or more computers, the parse tree to enumerate sequences of flights segments and a fare used with the flight segments to identify a set of sellable units; and
    combining one or more of the enumerated sequences of flight segments and fares according to the parsing to produce one or more tickets.

2. The method of claim 1 wherein translating the components of the set of sellable units that do not include a crossed combination of priceable units further comprises: adding a context free grammar rule for each of the sellable units.

3. The method of claim 1 wherein the sellable units are priceable units, the method further comprising use of a rule for the context-free grammar in the form P[i]==>P[1] I P[2] I . . . I P[N],
    wherein P[i] is a priceable unit and the symbol "==>" denotes producing.

4. The method of claim 2 wherein the sellable units are priceable units, the method further comprising using faring-atoms to represent sets of flights, and adding a context-free grammar rule further comprises:
    adding a rule for each faring-atom FA[k] of length L[k] as:
    FA[k]==>Flight[k][1] . . . Flight[k][L[k]], wherein the symbol "==>" denotes producing.

5. The method of claim 4 wherein the set of sellable units are priceable units and the set of priceable units has priceable-unit-label Q[i], which has a set of possible faring-atoms FAS[i][1]. . . FAS[i][n[i]] for each of its n[i] parts, with individual faring- atoms indexed FA[i][j][1]. . .FA[i][j][m[i,j]] where m[i,j] is the number of faring-atom possibilities for the j'th fare-component of priceable-unit-label i, and the altered grammar is of the form:
    Ticket ==>S
    S ==>Q S I <empty>
    Q ==>Q[1]I Q[2] I . . . I Q[N]
    (1 fare-component)
    Q[i]==>FAS[i][1]
    (2 fare-component)
    Q[i]==>FAS[i][1] FAS[i][2]
    (3 fare-component)
    Q[i]==>FAS[i][1] FAS[i][2] FAS[i][3]
    (4 fare-component)
    Q[i]==>FAS[i][1] FAS[i][2] FAS[i][3] FAS[i][4]
    FAS[i][j]==>FA[i][j][1] I FA[i][j][2] I . . . I FA[i][j][m],
    wherein S, Q are priceable units and the symbol "I " denotes an OR operation.

6. The method of claim 1 wherein the context-free grammar supports non-consecutive fare-components, the method further comprising:

producing, by the one or more computers, fare components, by allowing an arbitrary number of sellable-units to appear between a corresponding one of the fare-components of a sellable unit.

7. The method of claim 1 further comprising: extending, by the one or more computers, the context-free grammar to support non- consecutive fare-components by allowing an arbitrary number of sellable units to appear between every fare-component of a sellable-unit.

8. The method of claim 1 wherein the sellable units are priceable units, and the method further comprises:
extending, by the one or more computers, the non-terminal nodes of the context-free grammar by the one or more computers providing sets of partially completed priceable units to account for crossed priceable-units.

9. The method of claim 1 wherein the sellable-units contain multiple fare-components, and the method further comprises:
augmenting by the one or more computers the context-free grammar with a set of sellable units that represents a set of crossed priceable units whose first fare-component appears within an expansion of a non-terminal node of the context-free grammar; and
augmenting by the one or more computers the context-free grammar with a set that represents the set of crossed priceable units whose second fare-component appears within an expansion of a non-terminal node of the context-free grammar.

10. The method of claim 1 further comprising parsing a lattice of terminals with the context free-grammar to produce a packed parse forest representation in a form of an AND/OR graph representation.

11. The method of claim 10 further comprising:
enumerating priced tickets that include assignments of fares to flights from the AND/OR graph representation.

12. The method of claim 1 further comprising: associating price information with the context-free grammar.

13. The method of claim 12 wherein the sellable units are priceable units and associating price information with the context-free grammar further comprises:
linking, by one or more computers, the price information with non-terminal priceable-unit symbols in the context free grammar.

14. The method of claim 13 wherein linking links the price information with the context-free grammar linking fares in the sellable units as a list.

15. The method of claim 1 wherein the sellable units are priceable units and the priceable-units are represented as a set of priceable-unit-labels linked to priceable-unit-cores, where a priceable-unit-label is a factored representation of faring-atom combinations and a priceable-unit-core is a factored representation of fare combinations to encode the context-free grammar.

16. A computer program product tangibly embodied on a non-transitory computer readable medium for pricing a sequence of transportation units, the computer program product comprising instructions for causing a computing device to:
receive a set of sellable-units, each sellable unit comprising one or more flight segments and at least one fare associated with the one or more flight segments;
expand the set of sellable units into components;
identify the components that include a crossed combination of priceable units such that a first flight associated with a first priceable unit departs prior to a first flight associated with a second priceable unit, and the first flight associated with the second priceable unit departs prior to completion of a last flight associated with the first priceable unit;
translate the components of the expanded set of sellable-units that do not include a crossed combination of priceable units into a context-free grammar to represent combinations of the sellable-units;
produce a parse tree that corresponds to combinations of sellable-units;
parse the parse tree to enumerate sequences of flight segments and a fare used with the flight segments to identify a set of sellable units; and
combine one or more of the enumerated sequences of flight segments and fares according to the parsing to produce one or more tickets.

17. The computer program product of claim 16 wherein instructions to translate the components of the expanded set of sellable units that do not include a crossed combination of priceable units comprises instructions to:
add a context free grammar rule for each of the sellable units.

18. The computer program product of claim 16 further comprising instructions to use a rule for the context-free grammar of the form P[i]==>P[1] I P[2] I . . . I P[N], wherein P[i] is a priceable unit and the symbol "==>" denotes producing.

19. The computer program product of claim 17 wherein faring-atoms are represented as sets of flights and instructions to add a context-free grammar rule comprises:
add a rule for each faring-atom FA[k] of length L[k] as:
FA[k]==>Flight[k][1] . . . Flight[k][L[k]], wherein the symbol "==>" denotes producing.

20. The computer program product of claim 16 wherein the set of sellable units are priceable units and the set of priceable units has priceable-unit-label Q[i], which has a set of possible faring-atoms FAS[i][1]. . . FAS[i][n[i]] for each of its n[i] parts, with individual faring-atoms indexed FA[i][j][1]. . . FA[i][j][m[i,j]] where m[i,j] is the number of faring-atom possibilities for the j'th fare-component of priceable-unit-label i, and the altered grammar is of the form:
Ticket ==>S
S ==>Q S I <empty>
Q ==>Q[1] I Q[2] I . . . I Q[N]
(1 fare-component)
Q[i]==>FAS[i][1]
(2 fare-component)
Q[i]==>FAS[i][1] FAS[i][2]
(3 fare-component)
Q[i]==>FAS[i][1] FAS[i][2] FAS[i][3]
(4 fare-component)
Q[i]==>FAS[i][1] FAS[i][2] FAS[i][3] FAS[i][4]
FAS[i][j]==>FA[i][j][1] I FA[i][j][2] I . . . I FA[i][j][m],
wherein S, Q are priceable units and the symbol "I" denotes an OR operation.

21. The computer program product of claim 16 wherein the context-free grammar supports non-consecutive fare-components and the program includes instructions to:
produce fare components and allow an arbitrary number of sellable-units to appear between every fare-component of a sellable-unit.

22. The computer program product of claim 16 wherein the sellable-units contain multiple fare-components, and computer program product comprises instructions to:
augment the grammar with a set of sellable units that represents a set of crossed priceable units whose first fare-component appears within an expansion of a non-terminal node of the grammar; and augment the grammar with a set of sellable units that represents the set of crossed priceable units whose second fare-component appears within an expansion of a non-terminal node of the grammar.

23. The computer program product of claim 16 wherein instructions to parse a lattice of terminals with the context free grammar cause to be produced a packed parse forest representation in a form of an AND/OR graph representation.

24. The computer program product of claim 16 further comprising instructions to:
enumerate priced tickets that include assignments of fares to flights from the AND/OR graph representation.

25. The computer program product of claim 16 further comprising instructions to: associate price information with the context-free grammar.

26. The computer program product of claim 16 wherein instructions to associate price information further comprises instructions to:
link the price information with non-terminal sellable unit symbols using the context free grammar.

27. The computer program product of claim 26 wherein instructions to associate price information with the context-free grammar further comprises instructions to:
link the price information with the context-free grammar linking fares in the sellable units as a list.

28. A computer system comprising:
a processor and one or more memory modules;
instructions stored on the one or more memory modules causing the computer system to:
receive a set of sellable-units, each sellable unit comprising one or more flight segments and at least one fare associated with the one or more flight segments;
expand the set of sellable units into components;
identify the components that include a crossed combination of priceable units such that a first flight associated with a first priceable unit departs prior to a first flight associated with a second priceable unit, and the first flight associated with the second priceable unit departs prior to completion of a last flight associated with the first priceable unit;
translate the components of the expanded set of sellable-units that do not include a crossed combination of priceable units into a context-free grammar;
store the context free grammar in computer storage, the context free grammar representing combinations of the sellable-units;
produce a parse tree that corresponds to combinations of sellable-units;
parse the parse tree to enumerate sequences of flight segments and a fare used with the flight segments to identify a set of sellable units; and
combine one or more of the enumerated sequences of flight segments and fares according to the parsing to produce one or more tickets.

29. The system of claim 28 wherein the instructions causing the computer system to translate the set of sellable units that do not include a crossed combination of priceable units further comprises:
instructions to add a context free grammar rule for each of the sellable units.

30. The system of claim 28 wherein the sellable units are priceable units, and instructions further comprise instructions to use a rule for the context-free grammar of the form P[i]==>P[1] I P[2] I . . . I P[N], wherein P[i] is a priceable unit and the symbol "==>" denotes producing.

31. The system of claim 28 wherein the sellable units are priceable units and the priceable units use faring-atoms to represent sets of flights, and the instructions cause the computer system configured to add rules to the context-free grammar comprising:
add a rule for each faring-atom FA[k] of length L[k] as:
FA[k]==>Flight[k][1] . . . Flight[k][L[k]], wherein the symbol "==>" denotes producing.

32. The system of claim 31 wherein the set of sellable units are priceable units and the set of priceable units has priceable-unit-label Q[i] which has a set of possible faring-atoms FAS[i][1]. . . FAS[i][n[i]] for each of its n[i] parts, with individual faring-atoms indexed FA[i][j][1]. . . FA[i][j][m[i,j]] where m[i,j] is the number of faring-atom possibilities for the j'th fare-component of priceable-unit-label i, and the altered grammar is of the form:
Ticket ==>S
S ==>Q S I<empty>
Q ==>Q[1] I Q[2] I . . . I Q[N]
(1 fare-component)
Q[i]==>FAS[i][1]
(2 fare-component)
Q[i]==>FAS[i][1] FAS[i][2]
(3 fare-component)
Q[i]==>FAS[i][1] FAS[i][2] FAS[i][3]
(4 fare-component)
Q[i]==>FAS[i][1] FAS[i][2] FAS[i][3] FAS[i][4]
FAS[i][j]==>FA[i][j][1] ] FA[i][j][2] I ... I FA[i][j][m],
wherein S, Q are priceable units and the symbol "I" denotes an OR operation.

33. The system of claim 28 wherein the context-free grammar supports non-consecutive fare-components, the instructions further causing the computer system to:
produce fare components by allowing an arbitrary number of sellable-units to appear between a corresponding one of the fare-components of a sellable unit.

34. The system of claim 28, the instructions further causing the computer system to:
extend the context-free grammar to support non-consecutive fare-components by allowing an arbitrary number of sellable units to appear between every fare-component of a sellable-unit.

35. The system of claim 28 wherein the sellable units are priceable units, and the instructions further cause the computer system to:
extend the non-terminal nodes of the context-free grammar by the computer providing sets of partially completed priceable units to account for crossed priceable-units.

36. The system of claim 28 wherein the sellable-units contain multiple fare-components, and the instructions further cause the computer system to:
augment the context-free grammar with a set of sellable units that represents a set of crossed sellable-units whose first fare-component appears within an expansion of a non-terminal node of the context-free grammar; and
augment the context-free grammar with a set that represents the set of crossed sellable- units whose second fare-component appears within an expansion of a non-terminal node of the context-free grammar.

37. The system of claim 28, the instructions further causing the computer system to parse a lattice of terminals with the context free grammar to produce a packed parse forest representation in a form of an AND/OR graph representation.

38. The system of claim 37, the instructions further configured causing the computer system to:
enumerate priced tickets that include assignments of fares to flights from the AND/OR graph representation.

39. The system of claim 28, the instructions further causing the computer system to: associate price information with the context-free grammar.

40. The system of claim 28 wherein the sellable units are priceable units and associating price information with the context free grammar further comprises instructions causing the computer system to:
link by the computer the price information with non-terminal priceable-unit symbols in the context free grammar.

41. The system of claim 28, the instructions further causing the computer system to link the price information with the context-free grammar linking fares in the sellable units as a list.

42. The system of claim 28 wherein the sellable units are priceable units and the priceable-units are represented as a set of priceable-unit-labels linked to priceable-unit-cores, where a priceable-unit-label is a factored representation of faring-atom combinations and a priceable-unit-core is a factored representation of fare combinations to encode the context-free grammar.

* * * * *

UNITED STATES PATENT AND TRADEMARK OFFICE
CERTIFICATE OF CORRECTION

PATENT NO. : 8,583,460 B2
APPLICATION NO. : 11/184743
DATED : November 12, 2013
INVENTOR(S) : Carl G. DeMarcken It is certified that error appears in the above-identified patent and that said Letters Patent is hereby corrected as shown below:

In the Claims

Column 18, Line 19, after "segments", delete "to"

Column 18, Line 30-31, replace "P[1] I P[2] I . . . I P[N],," with -- P[1] | P[2] | . . . | [N], --

Column 18, Line 46, replace "faring- atoms" with -- faring-atoms --

Column 18, Line 51, replace "S = = >Q S I <empty>" with -- S = = >Q S | <empty> --

Column 18, Line 52, replace "Q = = >Q[1] I Q[2] I . . . I Q[N]" with
-- Q = = >Q[1] | Q[2] | . . . | Q[N] --

Column 18, Line 62, replace "FAS[i][j] = = > FA[i][j][1] I FA[i][j][2] I . . . I FA[i][j][m]," with
-- FAS[i][j] = = >FA[i][j][1] | FA[i][j][2] | . . . | FA[i][j][m], --

Column 18, Line 63, replace "I" with -- | --

Column 19, Line 7, replace "non- consecutive" with -- non-consecutive --

Column 20, Line 11, after "segments", delete "to"

Column 20, Line 24, replace "P[1] I P[2] I . . . I P[N]," with -- P[1] | P[2] | . . . | [N], --

Column 20, Line 42, replace "S = = >Q S I <empty>" with -- S = = >Q S | <empty> --

Column 20, Line 43, replace "Q = = >Q[1] I Q[2] I . . . I Q[N]" with
-- Q = = >Q[1] | Q[2] | . . . | Q[N] --

Signed and Sealed this
First Day of July, 2014

Michelle K. Lee
*Deputy Director of the United States Patent and Trademark Office*

CERTIFICATE OF CORRECTION (continued)
U.S. Pat. No. 8,583,460 B2

Column 20, Line 52, replace "FAS[i][j] = = >FA[i][j][1] I FA[i][j][2] I . . . I FA[i][j][m]," with -- FAS[i][j] = = >FA[i][j][1] | FA[i][j][2] | . . . | FA[i][j][m], --

Column 20, Line 53, replace "I" with -- | --

Column 21, Line 50, after "segments", delete "to"

Column 21, Line 64, replace "P[1] I P[2] I . . . I P[N]," with -- P[1]|P[2] | . . . | [N], --

Column 22, Line 9, replace "Q[i]" with -- Q[i], --

Column 22, Line 17, replace "S = = >Q S I <empty>" with -- S = = >Q S | <empty> --

Column 22, Line 18, replace "Q = = >Q[1] I Q[2] I . . . I Q[N]" with -- Q = = >Q[1] | Q[2] | . . . | Q[N] --

Column 22, Line 27, replace "FAS[i][j] = = >FA[i][j][1] ] FA[i][j][2] I . . . I FA[i][j][m]," with -- FAS[i][j] = = >FA[i][j][1] | FA[i][j][2] | . . . | FA[i][j][m], --

Column 22, Line 28, replace "I" with -- | --

Column 22, Line 57, replace "sellable- units" with -- sellable-units --

Column 22, Lines 64-65, after "further", delete "configured"